(12) United States Patent
Murray et al.

(10) Patent No.: US 10,660,330 B2
(45) Date of Patent: May 26, 2020

(54) MOSQUITO CONTROL PRODUCT

(71) Applicant: Penta 5 USA, LLC, Sarasota, FL (US)

(72) Inventors: R. Charles Murray, Sarasota, FL (US); John Harlin, Sarasota, FL (US)

(73) Assignee: Penta 5 USA, LLC, Sarasota, FL (US)

( * ) Notice: Subject to any disclaimer, the term of this patent is extended or adjusted under 35 U.S.C. 154(b) by 397 days.

(21) Appl. No.: 15/412,820

(22) Filed: Jan. 23, 2017

(65) Prior Publication Data

US 2017/0208797 A1    Jul. 27, 2017

Related U.S. Application Data

(60) Provisional application No. 62/281,418, filed on Jan. 21, 2016.

(51) Int. Cl.

| | | |
|---|---|---|
| *A01N 25/00* | (2006.01) | |
| *A01N 37/36* | (2006.01) | |
| *A01N 59/04* | (2006.01) | |
| *A01N 65/22* | (2009.01) | |
| *A01N 65/24* | (2009.01) | |
| *A01N 65/44* | (2009.01) | |
| *B65D 75/00* | (2006.01) | |
| *B65D 75/58* | (2006.01) | |
| *B65D 81/32* | (2006.01) | |
| *A01N 25/22* | (2006.01) | |
| *A01N 65/20* | (2009.01) | |
| *A01N 65/16* | (2009.01) | |
| *A01N 65/12* | (2009.01) | |
| *A01N 63/30* | (2020.01) | |

(52) U.S. Cl.
CPC ........... *A01N 25/22* (2013.01); *A01N 25/006* (2013.01); *A01N 37/36* (2013.01); *A01N 59/04* (2013.01); *A01N 63/30* (2020.01); *A01N 65/12* (2013.01); *A01N 65/16* (2013.01); *A01N 65/20* (2013.01); *A01N 65/22* (2013.01); *A01N 65/24* (2013.01); *A01N 65/44* (2013.01); *B65D 75/008* (2013.01); *B65D 75/5883* (2013.01); *B65D 81/3266* (2013.01); *Y02A 50/327* (2018.01)

(58) Field of Classification Search
CPC ........ A01N 63/04; A01N 65/22; A01N 65/24; A61K 36/064; A61K 36/53; A61K 36/54; B65D 75/008; B65D 75/5883; B65D 81/3266

See application file for complete search history.

(56) References Cited

U.S. PATENT DOCUMENTS

| | | |
|---|---|---|
| 2009/0069407 A1 | 3/2009 | Gries et al. |
| 2014/0242135 A1 | 8/2014 | Zwiebel et al. |
| 2015/0043838 A1* | 2/2015 | Jaouen ................... A45D 34/00 383/38 |

FOREIGN PATENT DOCUMENTS

WO    WO 2005/074363    *    8/2005

OTHER PUBLICATIONS

Flair Mail, vol. 6, No. 2, May 2014, Flair Flexible Packaging Corporation: "Product Spotlight: Matrix24 Laboratories provides necessary buzzkill for the outdoors."*
Zibaee, I. et al., "Synergistic effect of some essential oils on toxicity and knockdown effects, against mosquitos, cockroaches and housefly," Arthropods, vol. 4(4), 2015, pp. 107-123.*
Meseyton, T., "Biting the biters back," Central Plains Herald-Leader, Jul. 17, 2014.*
Mcquarrie, This Mosquito PaQ Pouch Attracts Bugs to Draw Them Away from Humans, Trend Hunter Eco, Sep. 21, 2016 (retrieved on Jun. 9, 2017). Retrieved from the Internet: <URL: http://www.trendhunter.com/trends/mosquito-deterrent> entire document.
International Search Report for PCT/US2017/014540, dated Apr. 20, 2017, 4 pp.

* cited by examiner

*Primary Examiner* — John Pak
(74) *Attorney, Agent, or Firm* — Dinsmore & Shohl LLP

(57) ABSTRACT

A mosquito control product includes a two part composition including separated wet and dry ingredients. The wet and dry ingredients include active and inert ingredients. The active ingredients include thyme, rosemary, cinnamon, and citronella oil and the inert ingredients include water, sugar, yeast, wheat flour, sodium bicarbonate, and licorice extract. When the wet and dry ingredients are combined they form a carrier agent contacting a mosquito with the active ingredients wherein the mosquito is discouraged from seeking a blood meal.

17 Claims, 14 Drawing Sheets

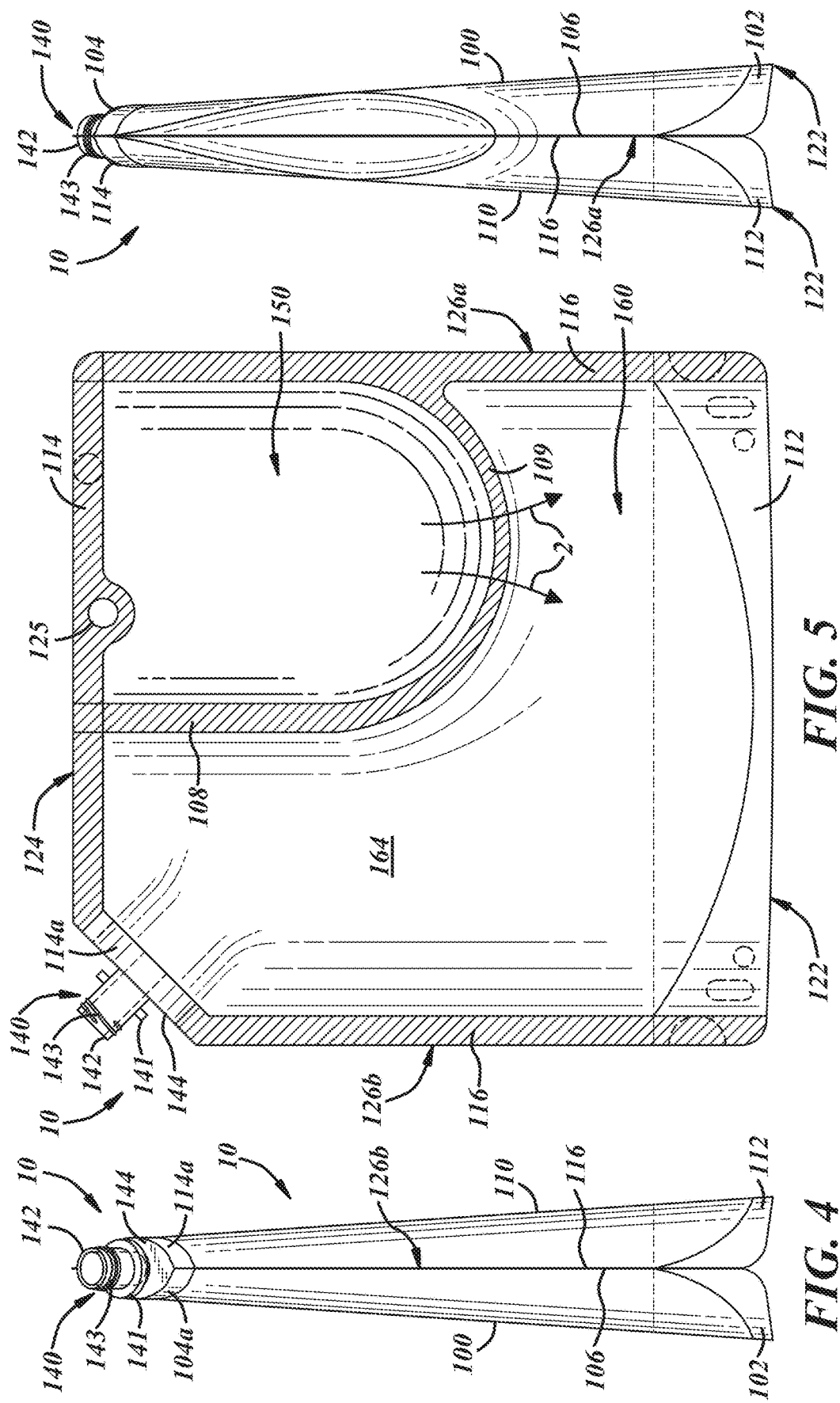

MOSQUITO CONTROL PRODUCT

CROSS-REFERENCE TO RELATED APPLICATIONS

The instant application claims priority to U.S. Provisional Application Ser. No. 62/281,418 filed Jan. 21, 2016, the entire contents of which are incorporated herein by reference.

FIELD OF THE INVENTION

The instant application is directed to a formulation for controlling or modifying the biting behavior of mosquitos.

BACKGROUND OF THE INVENTION

Mosquito bites often cause annoying reactions in humans and animals. Additionally, mosquito bites are a vector for many types of disease including: malaria, Dengue Fever, Chikungunya, West Nile and Zika viruses as well as other forms of disease.

There is a need to prevent mosquitos from biting a host to lessen the discomfort of a bite reaction and to prevent the potential spread of a disease.

Accordingly, a natural non-toxic ingredient based product that alters a mosquito's biting behavior preventing bites to humans and animals would be desirable.

SUMMARY OF THE INVENTION

In one aspect, there is disclosed a mosquito control product that includes a two part composition including separated wet and dry ingredients. The wet and dry ingredients include active and inert ingredients. When the wet and dry ingredients are combined they form a carrier agent contacting a mosquito with the active ingredients wherein the mosquito is discouraged from seeking a blood meal.

In another aspect, there is disclosed a mosquito control product that includes a two part composition including separated wet and dry ingredients. The wet and dry ingredients include active and inert ingredients. The active ingredients include thyme, rosemary, cinnamon, and citronella oil and the inert ingredients include water, sugar, yeast, wheat flour, sodium bicarbonate, and licorice extract. When the wet and dry ingredients are combined they form a carrier agent contacting a mosquito with the active ingredients wherein the mosquito is discouraged from seeking a blood meal.

In yet another aspect, there is disclosed a mosquito control product that includes a two part composition including separated wet and dry ingredients. The wet and dry ingredients include active and inert ingredients. The dry ingredients are positioned in an upper compartment of a pouch and the wet ingredients are positioned in a lower compartment of a pouch. The upper and lower compartments are separated by a frangible seal. When the frangible seal is ruptured the wet and dry ingredients are combined and form a carrier agent exiting the pouch and contacting a mosquito with the active ingredients wherein the mosquito is discouraged from seeking a blood meal.

Additional features and advantages of mosquito control products described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

BRIEF DESCRIPTION OF THE DRAWINGS

FIG. 4 is a front view of the flexible pouch depicted in FIG. 1;

FIG. 5 is another side view of the flexible pouch depicted in FIG. 1;

FIG. 6 is a rear view of the flexible pouch depicted in FIG. 1;

FIG. 10 is a side view of the flexible pouch depicted in FIG. 9;

FIG. 14 is a front view of the flexible pouch depicted in FIG. 9;

DESCRIPTION OF THE EMBODIMENTS

Figure 1:
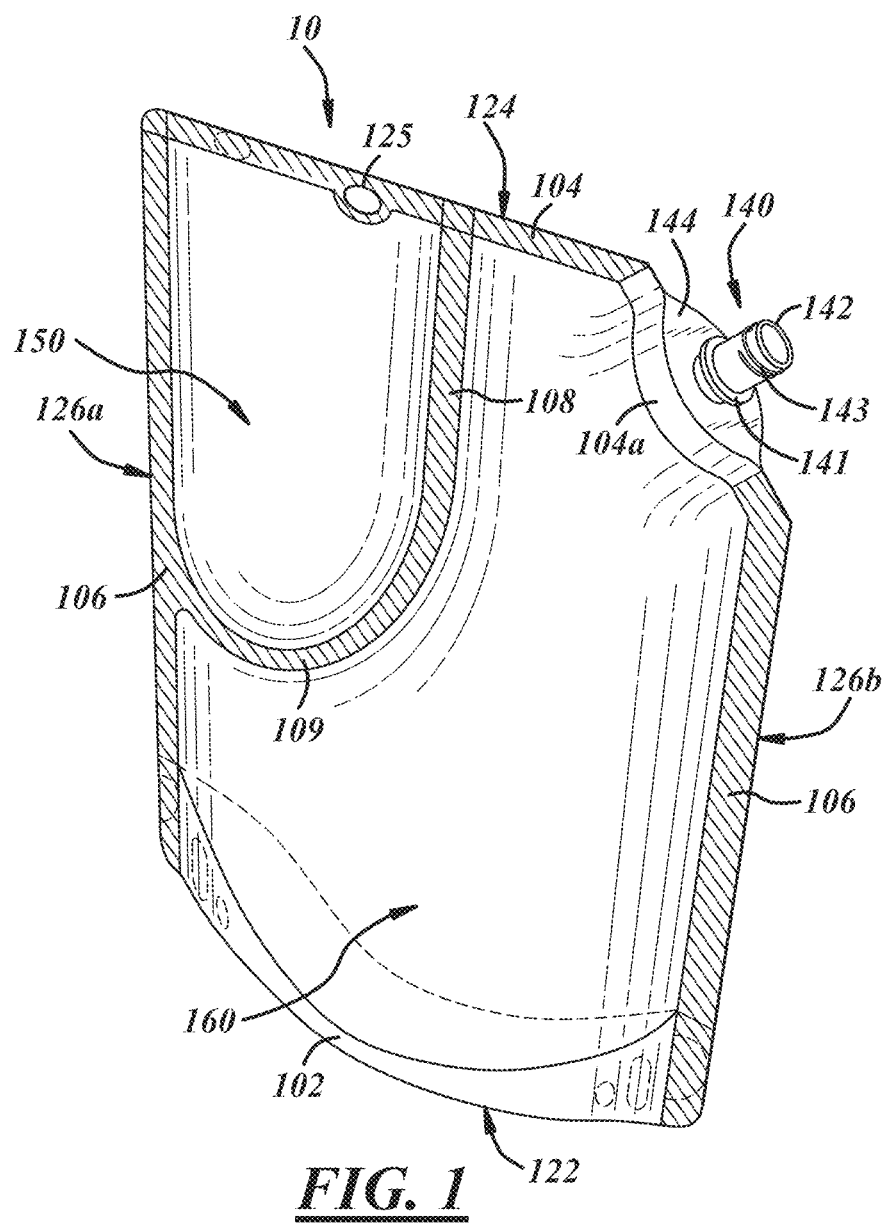
FIG. 1 is a perspective view of a two-component flexible pouch according to one or more embodiments disclosed and described herein.
Figure 3:
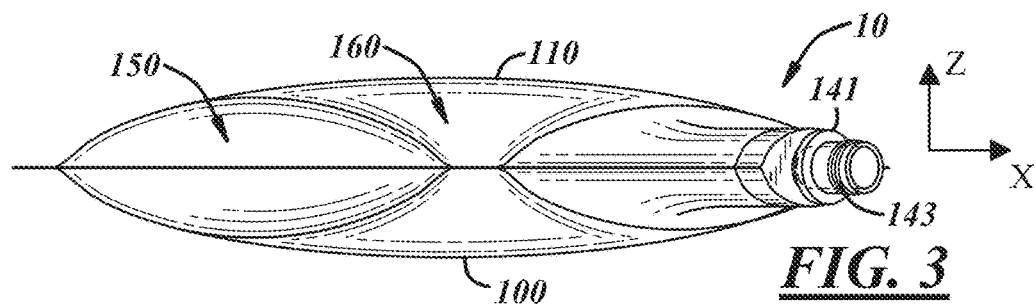
FIG. 3 is a top view of the flexible pouch depicted in FIG. 1.

The mosquito control product as described herein may be utilized to discourage mosquitos from taking a blood meal to thereby affect the reproduction cycle of the mosquito. In one aspect, the mosquito control product may include a two-part formulation including liquid and dry ingredients. The ingredients may be natural or nontoxic in nature to allow use near humans without fear of the toxicity of the product.

The liquid and dry ingredients may be separated from each other and then combined to activate the product, as will be discussed in more detail below. In one aspect, the liquid and dry ingredients may be separated from each other in a container such as a pouch as described in U.S. patent application Ser. No. 15/360,446 filed on Nov. 23, 2016 which is incorporated herein by reference.

The liquid and dry ingredients may include both include inert and active ingredients as will be discussed in more detail below. In one aspect, the active ingredients may be referred to as confounding agents such that when a mosquito is exposed to them it will affect its desire for a blood meal. The active ingredients may include thyme, rosemary, cinnamon, and citronella oil. Inactive or inert ingredients may include water, sugar, yeast, wheat flour, sodium bicarbonate, and licorice extract.

When the liquid and dry ingredients are combined, the sugar and yeast react in a fermentation reaction to produce alcohol and carbon dioxide as well as lactic acid which may serve as an attractant to a mosquito. In this manner, the sugar and yeast produce a carrier agent ($CO_2$) for the active ingredients which include thyme, rosemary, cinnamon and citronella oil as described above. In one aspect, the $CO_2$ may attract the mosquito and act as the carrier for the active ingredients.

Various sugars may be utilized in the formulation. For example, glucose or sucrose may be utilized. In one aspect, the type and amount of sugar may affect how quickly the fermentation process begins and may vary the amount of carbon dioxide produced over a varying time period. The carbon dioxide produced by the fermentation reaction transports the active ingredients to come into contact with a mosquito. When the mosquito is exposed to the active ingredients, it will affect the desire to seek a blood meal.

The formulations as described herein may be packaged in a two component pouch structure as described below.

Referring to FIGS. 1-7, a flexible pouch for containing two separate products that may be brought into contact with each other upon rupture of an internal frangible seal is provided. The flexible pouch includes a front panel, a back panel and a pair of side seals. An upper compartment is formed between the front panel, the back panel, one of the pair of side seals and an intermediate side seal positioned between the pair of side seals. A bottom frangible seal may separate the upper compartment from a lower compartment that is formed beneath the upper compartment between the front panel and the back panel. A vertical passage extends between the intermediate side seal and another of the pair of side seals from the lower compartment to an opening. Breaking through or rupturing of the bottom frangible seal provides a fluid passageway from the upper compartment to the lower compartment. A first product contained within the upper compartment may flow into the lower compartment containing a second product when the frangible seal is ruptured. Contact of the first product with the second product may generate or result in the creation of a desired third product. For example and without limitation, the first product may be a liquid, solid or gas, the second product may be a liquid, solid, or gas, and the third product may be a solid, liquid or gas that is formed when the first product comes into contact with the second product. The third product, e.g., a gas, can flow through the vertical passage and out of the opening in order to be released from or exit the flexible pouch.

Figure 2:
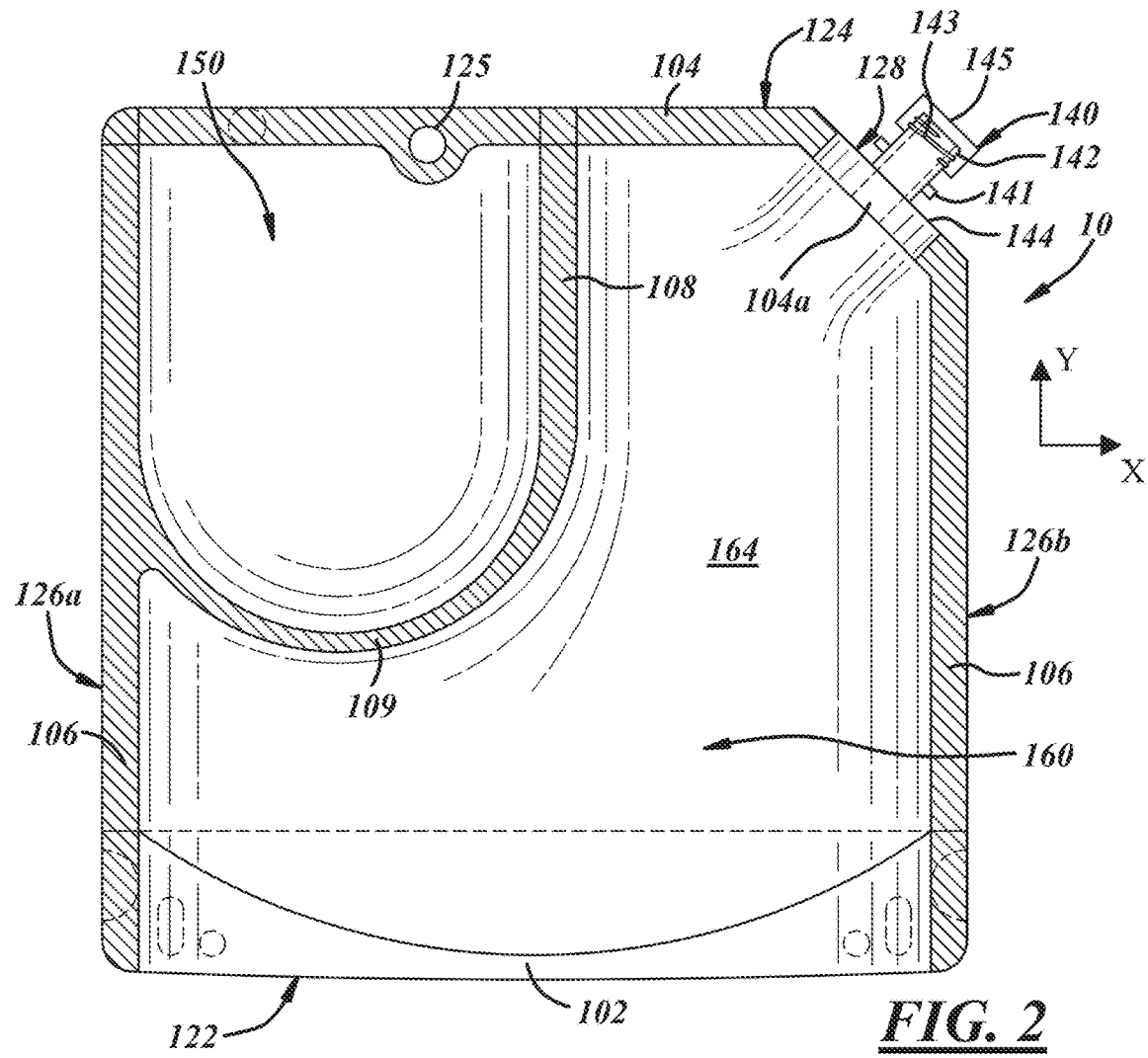
FIG. 2 is a side view of the flexible pouch depicted in FIG. 1.
Figure 7:
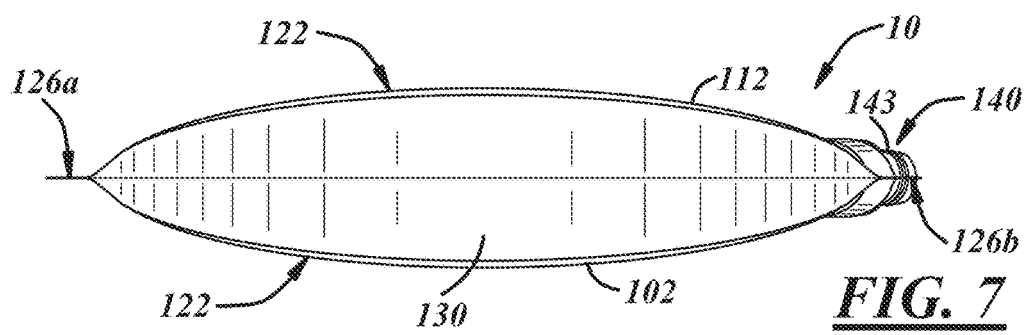
FIG. 7 is a bottom view of the flexible pouch depicted in FIG. 1.

Still referring to FIGS. 1-7, a two-compartment flexible pouch 10 includes a front panel 100 and a back panel 110. The front panel 100 may have a bottom edge portion 102, a top edge portion 104 and a pair of side edge portions 106 (FIG. 2). The back panel 110 may have a bottom edge portion 112, a top edge portion 114 and a pair of side edge portions 116 (FIG. 5). The front panel 100 may be attached to the back panel 110 with a bottom seal 122, a top seal 124 and a pair of side seals 126a, 126b. In embodiments, a gusset 130 (FIG. 7) can be positioned between the bottom edge portion 102 of the front panel 100 and the bottom edge portion 112 of the back panel 110 such that a stable base for the flexible pouch 10 is provided. That is, the gusset 130 may be attached to the bottom edge portions 102, 112 with the bottom seal 122 such that the flexible pouch 10 can stand or remain upright as depicted in FIGS. 1, 4, and 6.

In embodiments, the bottom seal 122, top seal 124 and pair of side seals 126a, 126b may be formed from a seal, e.g., a heat seal, that joins the bottom edge portions 102, 112 together, the top edge portions 104, 114 together and the side edge portions 106, 116 together. In other embodiments, one or more of the bottom seal 122, top seal 124 and pair of side seals 126a, 126b may be formed from a fold line created by folding a single panel to form the front panel 100 and back panel 110. Accordingly, the term "seal" as used herein refers to a boundary of an interior of the flexible pouch and may be formed by joining a portion of a front panel to a portion of a back panel, e.g., via a heat seal, or in the alternative, may be formed by folding a single panel to form a front panel and a back panel with a fold line there between.

The flexible pouch 10 may include an upper compartment 150 formed between the front panel 100, the back panel 110, one of the pair of side seals 126a, an intermediate side seal 108, and a bottom frangible seal 109. The bottom frangible seal 109 may extend from and between the intermediate side seal 108 to the side seal 126a. The flexible pouch 10 also includes a lower compartment 160 formed beneath the upper compartment 150 between the front panel 100 and the back panel 110. The flexible pouch 10 may also include a vertical passage 164 extending between the intermediate side seal 108 and another of the pair of side seals 126b from the lower compartment 160 to an opening 140. Rupture of the bottom frangible seal 109 provides a fluid passageway between the upper compartment 150 and the lower compartment 160. The bottom frangible seal 109 is designed and configured to rupture when a predetermined amount of force is applied thereto as described in greater detail below. The intermediate side seal 108 may be a permanent seal designed and configured not to rupture when force applied to the flexible pouch 10 ruptures the bottom frangible seal 109. The bottom frangible seal 109 may have an arcuate shape and provide a funnel shape from the upper compartment 150 to the lower compartment 160. In this manner, a product contained within the upper compartment 150 may fully drain or flow from the upper compartment 150 into the lower compartment 160. Also, the bottom frangible seal may be spaced apart from the bottom seal 122 of the flexible pouch 10 such that sufficient space or volume is provided for a product contained within the upper compartment 150 to flow into the lower compartment 160. For example, and without limitation, the bottom frangible seal 109 may be spaced apart from the bottom seal 122 between about 25% to about 50% of the overall height (Y direction) of the flexible pouch 10.

Figure 8:
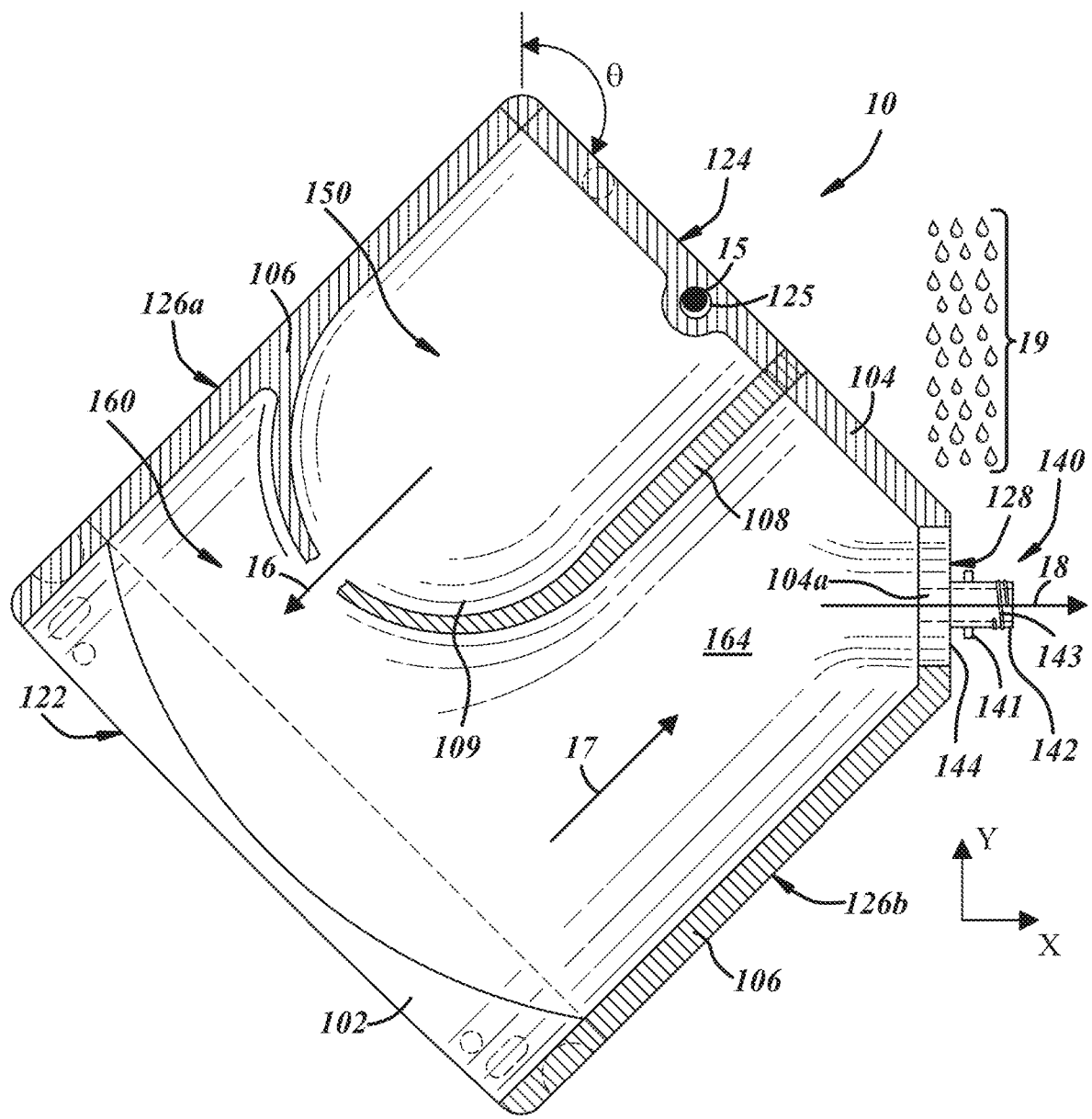
FIG. 8 is a side view of the flexible pouch depicted in FIG. 2 hanging in a tilt position according to one or more embodiments disclosed and described herein.

In embodiments, an aperture 125 extends through the top seal 124. The position of the aperture 125 along the top seal 124 is off-center along the width (X direction) of the flexible pouch 10. The off-center position of the aperture 125 along the width (X direction) of the top seal 124 is configured for the flexible pouch 10 to rotate from a stand-up position as depicted in FIG. 2 to a tilt position as depicted in FIG. 8 when the flexible pouch 10 is hung from an object 15 such as a rod, pin, nail, etc., extending through the aperture 125. That is, hanging the flexible pouch 10 with the object 15 extending through the aperture 125 results in the flexible pouch 10 rotating in a tilt position such that the opening 140 rotates in a downwardly direction (−Y direction). In embodiments, the opening 140 rotates in a downwardly direction between about 15 degrees to about 75 degrees. In other embodiments, the opening 140 rotates in a downwardly direction between about 30 degrees to about 60 degrees. Rotation of the flexible pouch 10 in a downwardly direction may prevent objects 19 from falling within the opening 140 as described in greater detail below.

In embodiments, a spout fitment 142 is positioned within the opening 140. The spout fitment 142 may have a flange 141, threads 143 and a base portion 144 that is sealed to an opening edge 104*a* of the front panel 100 and an opening edge 114*a* of the back panel 110 with a seal 128. A cap 145 can be attached to the spout fitment 142 and removed once the bottom frangible seal 109 has been ruptured and the first product has come into contact with the second product. In embodiments the cap 145 has threads (not shown) that engage the threads 143 of the spout fitment 142 for securement of the cap 145 to the spout fitment 142. The spout fitment 142 with the cap 145 allows for storage of the flexible pouch 10 and any products that may be contained within the upper compartment 150 and the lower compartment 160.

The flexible pouch 10 may be formed and filled by attaching the front panel 100 to the back panel 110 with the bottom seal 122 and side seals 126*a*, 126*b* using a flexible pouch manufacturing machine (not shown). The intermediate side seal 108 and bottom frangible seal 109 may be formed such that the upper compartment 150, lower compartment 160 and vertical passage 164 are provided. The upper compartment 150 may be filled with a desired quantity of a first product, for example and without limitation a liquid or a solid, at a first filling station on the flexible pouch manufacturing machine. The top seal 124 may be formed across an upper portion of the flexible pouch 10 such that the first product is sealed within the upper compartment 150. The flexible pouch may be moved to a second filling station where a diving tube (not shown) is inserted into the vertical passage 164 and/or lower compartment 160 through the spout fitment 142. The lower compartment 160 may be filled with a desired amount of a second product, for example and without limitation a liquid or a solid, through the diving tube and the cap 145 may be attached to the spout fitment 142 to seal the second product within the lower compartment 160.

Referring now to FIG. 8, in use the flexible pouch 10 may include a first product contained within the upper compartment 150 and a second product contained in the lower compartment 160. The first product may be a solid such as, without limitation, yeast, and the second product may be a liquid such as, without limitation, water. The bottom frangible seal 109 is ruptured by applying a compressive force on the upper compartment 150. For example and without limitation, grasping and rolling the upper compartment 150 from the top seal 124 towards the bottom frangible seal 109 may create an internal pressure within the upper compartment 150 that exerts a force on the bottom frangible seal 109. Upon reaching a predefined force that is greater than a sealing force provided by the bottom frangible seal 109, the bottom frangible seal 109 ruptures a fluid passageway from the upper compartment 150 to the lower compartment 160 is created. Once the fluid passageway from the upper compartment 150 to the lower compartment 160 is created, the first product contained within the upper compartment 150 flows from the upper compartment 150 into the lower compartment 160 as depicted by arrow 16 and comes into contact and/or mixes with the second product and a third product is produced. The third product, e.g., a gas such as and without limitation carbon dioxide, exits the flexible pouch 10 by flowing up through the vertical passage 164 as depicted by arrow 17 and out through the opening 140 as depicted by arrow 18. The third product may attract insects such as, and without limitation, mosquitoes to the flexible pouch 10. The flexible pouch 10 can be hung (suspended) with the object 15 extending through the aperture 125 and the opening 140 rotates downwardly as described above. Upon rotating to a downward position, objects such rain, leaves, etc. are prevented from falling within the opening 140, thereby protecting the contents within the flexible pouch 10.

Figure 9:
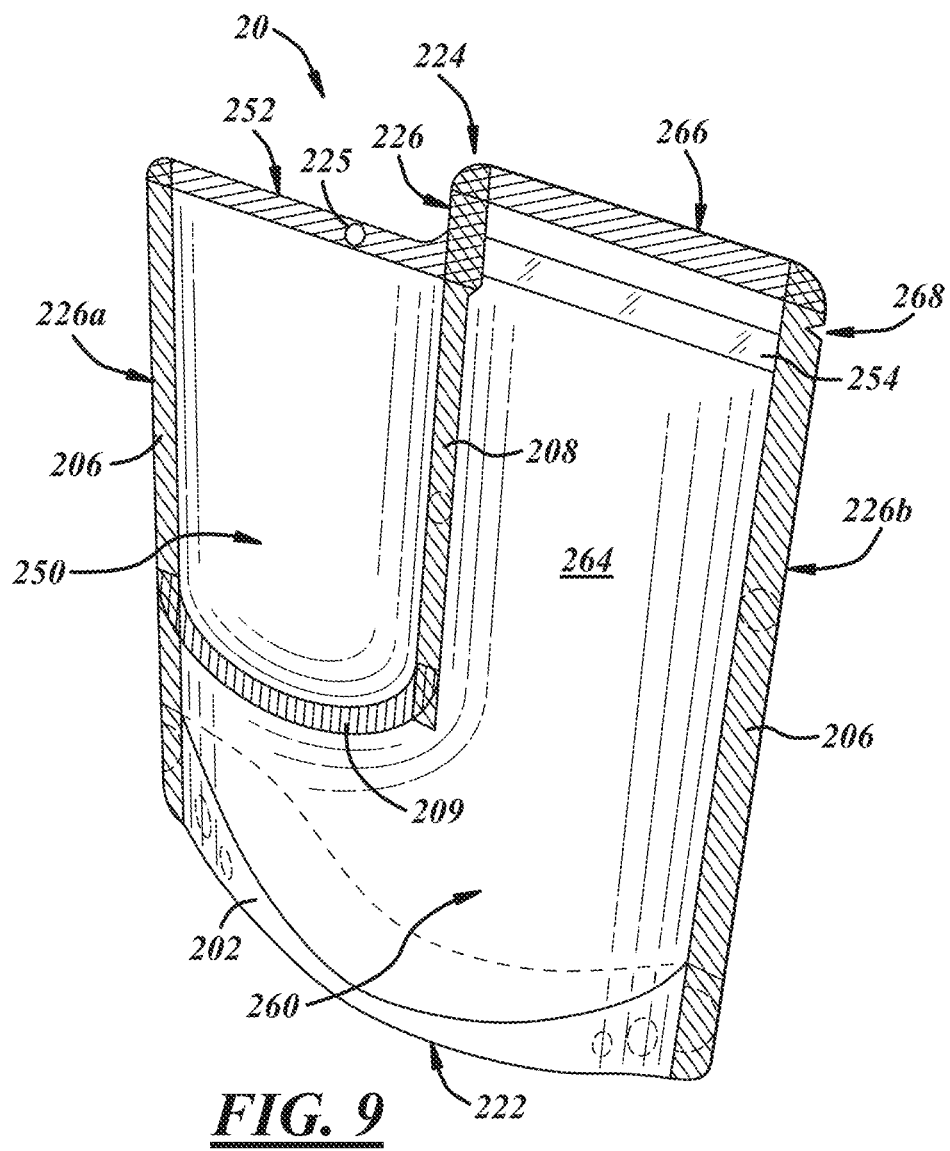
FIG. 9 is a perspective view of a two-compartment flexible pouch according to one or more embodiments disclosed and described herein.
Figure 11:
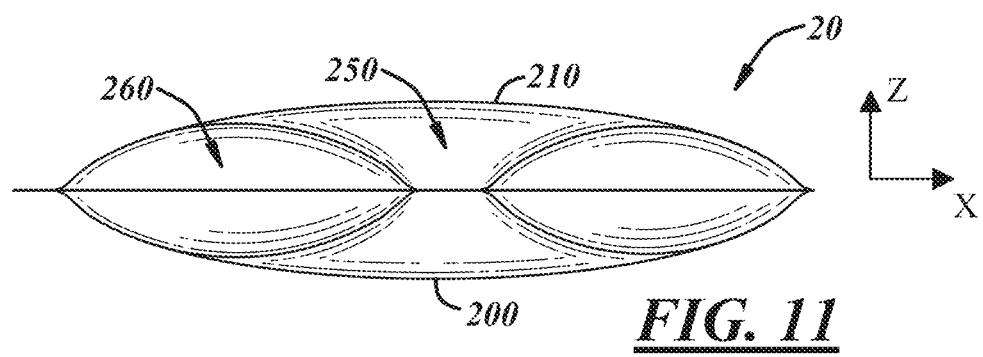
FIG. 11 is a top view of the flexible pouch depicted in FIG. 9.
Figure 12:
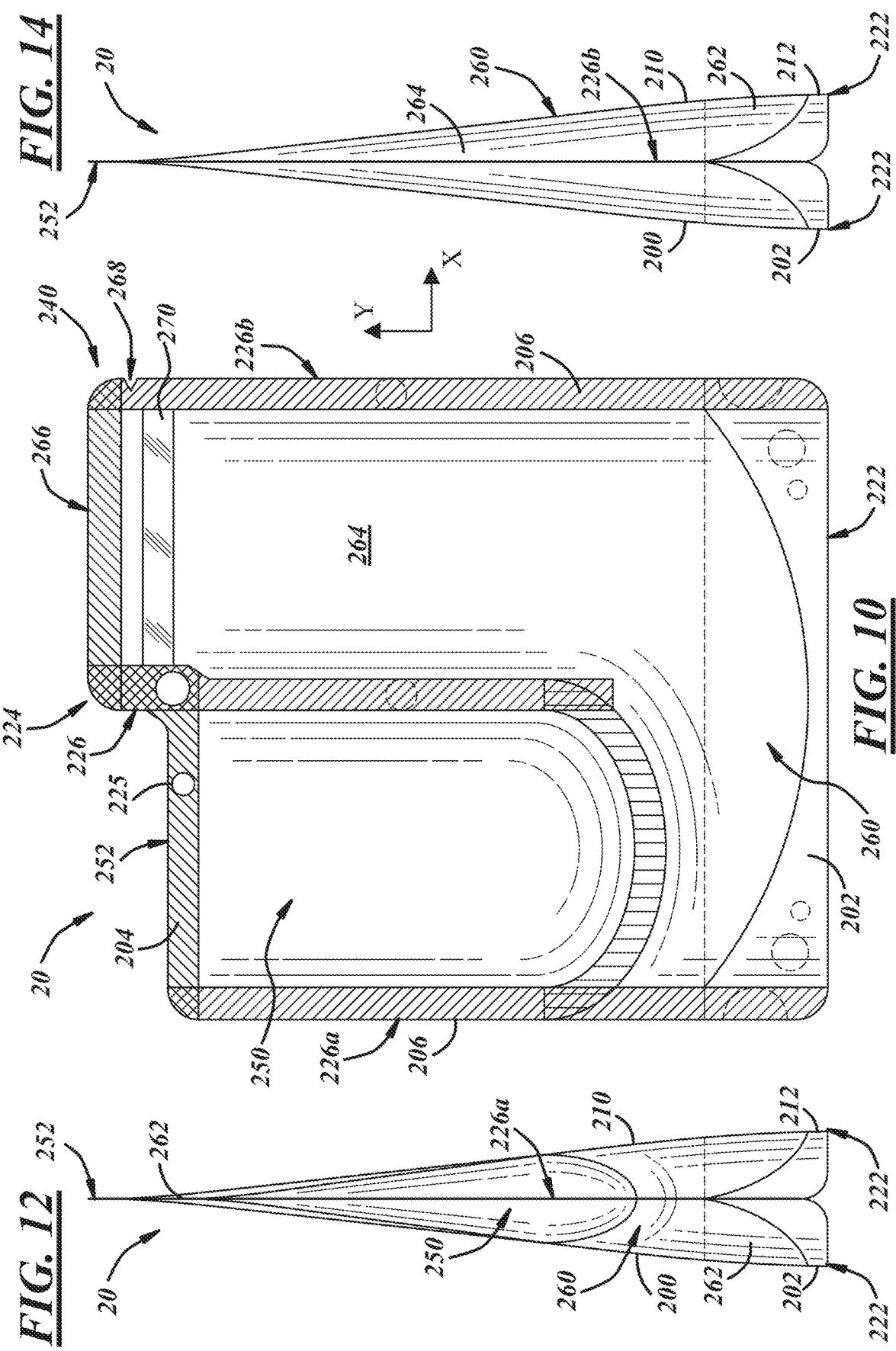
FIG. 12 is a rear view of the flexible pouch depicted in FIG. 9.
Figure 13:
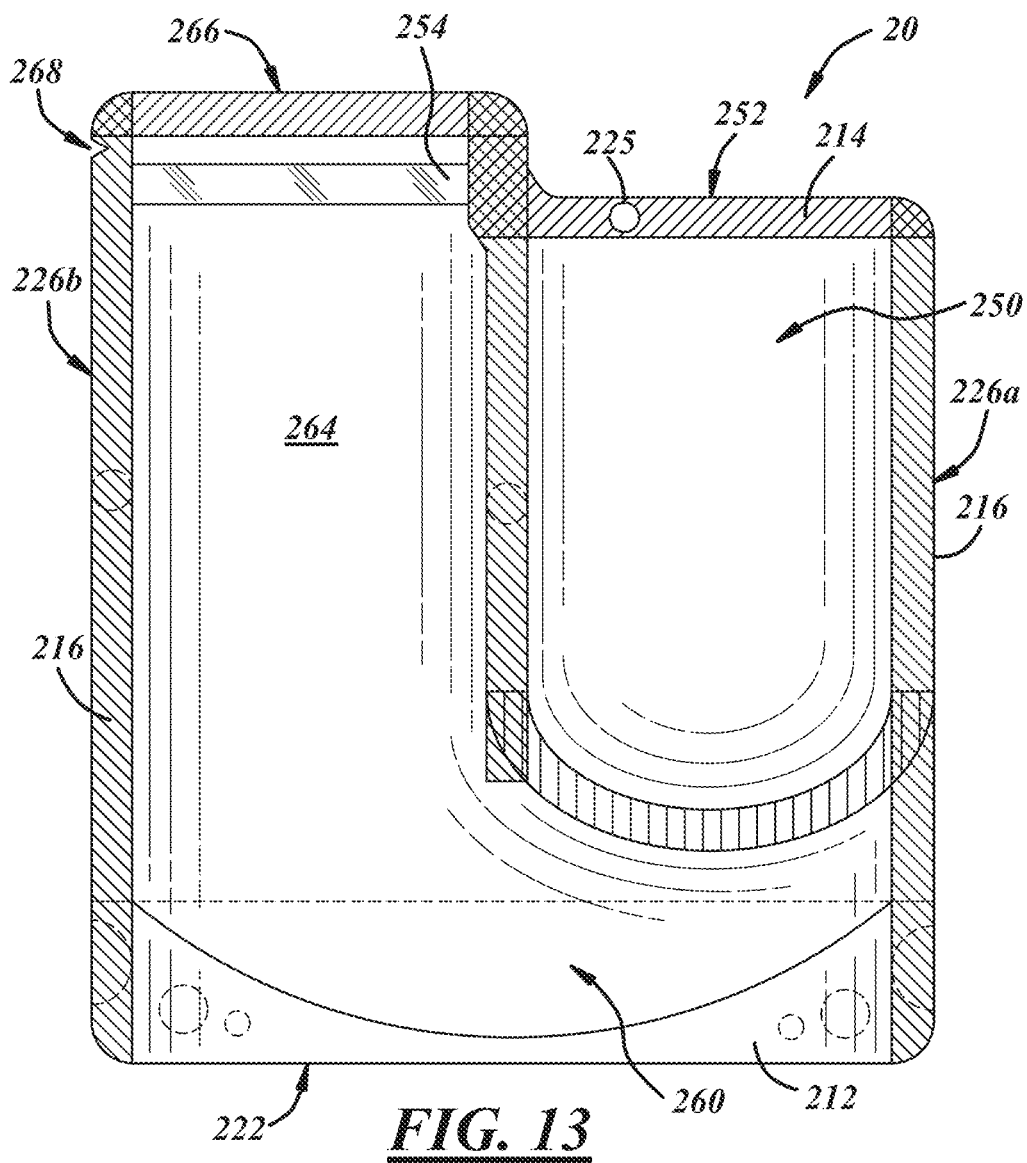
FIG. 13 is another side view of the flexible pouch depicted in FIG. 9.
Figure 15:
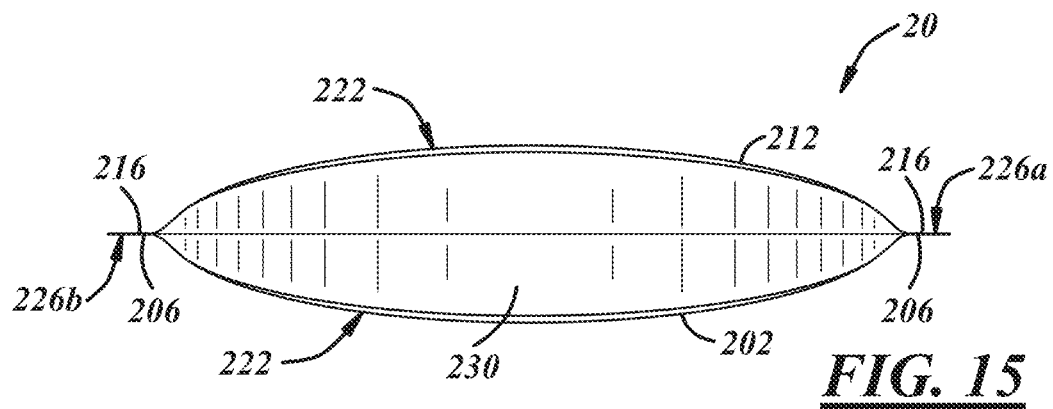
FIG. 15 is a bottom view of the flexible pouch depicted in FIG. 9.

Referring now to FIGS. 9-15, another embodiment of a two-compartment flexible pouch is shown generally at reference numeral 20. The flexible pouch 20 includes a front panel 200 and a back panel 210. The front panel 200 may have a bottom edge portion 202, a top edge portion 204 and a pair of side edge portions 206 (FIG. 10). The back panel 210 may have a bottom edge portion 212, a top edge portion 214 and a pair of side edge portions 216 (FIG. 13). The front panel 200 may be attached to the back panel 210 with a bottom seal 222, a top seal 224 and a pair of side seals 226*a*, 226*b*. In embodiments, a gusset 230 (FIG. 15) can be positioned between the bottom edge portion 202 of the front panel 200 and the bottom edge portion 212 of the back panel 210 such that a stable base for the flexible pouch 20 is provided. That is, the gusset 230 may be attached to the bottom edge portions 202, 212 with the bottom seal 222 such that the flexible pouch 20 can stand or remain upright as depicted in FIGS. 9, 12, and 14.

In embodiments, the bottom seal 222, top seal 224 and pair of side seals 226*a*, 226*b* may be formed from a seal, e.g., a heat seal, that joins the bottom edge portions 202, 212 together, the top edge portions 204, 214 together and the side edge portions 206, 216 together. In other embodiments, one or more of the bottom seal 222, top seal 224 and pair of side seals 226*a*, 226*b* may be formed from a fold line created by folding a single panel to form the front panel 200 and the back panel 210.

The flexible pouch 20 may include an upper compartment 250 formed between the front panel 200, the back panel 210, one of the pair of side seals 226*a*, an intermediate side seal 208, and a bottom frangible seal 209. The bottom frangible seal 209 may extend from and between the intermediate side seal 208 to the side seal 226*a*. An upper compartment top seal 252 may extend across an upper portion of the upper compartment 250. The flexible pouch 20 also includes a lower compartment 260 formed beneath (−Y direction) the upper compartment 250 between the front panel 200 and the back panel 210. The flexible pouch 20 may also include a vertical passage 264 extending between the intermediate side seal 108 and another of the pair of side seals 226b from the lower compartment 260 to an opening 240. A vertical passage top seal 266 may extend across an upper portion of the vertical passage 264. The vertical passage top seal 266 may be positioned above (+Y direction) the upper compartment top seal 252 as depicted in FIGS. 9, 10, and 13. A vertical seal 226 may extend from the upper compartment top seal 252 to the vertical passage top seal 266. Rupture of the bottom frangible seal 209 provides a fluid passageway between the upper compartment 250 and the lower compartment 260. The bottom frangible seal 209 is designed and configured to rupture when a predetermined amount of force is applied thereto as described in greater detail below. The intermediate side seal 208 may be a permanent seal designed and configured not to rupture when force applied to the flexible pouch 20 ruptures the bottom frangible seal 209. The bottom frangible seal 209 may have an arcuate shape and provide a funnel shape from the upper compartment 250 to the lower compartment 260. In this manner, a product contained within the upper compartment 250 may fully drain or flow from the upper compartment 250 into the lower compartment 260. Also, the bottom frangible seal 209 may be spaced apart from the bottom seal 222 of the flexible pouch 20 such that sufficient space or volume is provided for a product contained within the upper compartment 250 to flow into the lower compartment 260. For example, and without limitation, the bottom frangible seal 209 may be spaced apart from the bottom seal 222 between about 25% to about 50% of the overall height (Y direction) of the flexible pouch 20.

Figure 16:
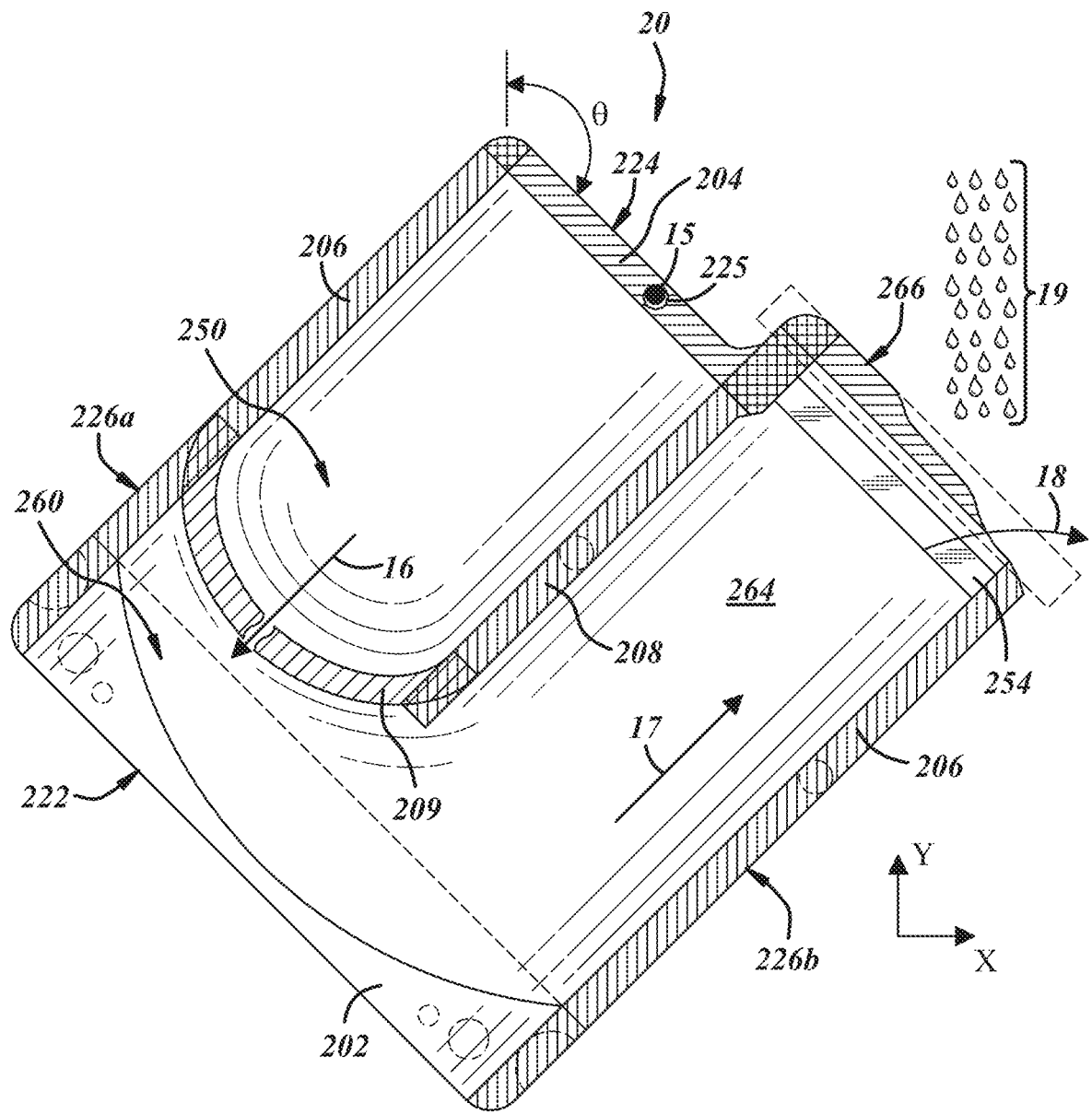
FIG. 16 is a side view of the flexible pouch depicted in FIG. 9 hanging in a tilt position according to one or more embodiments disclosed and described herein

In embodiments, an aperture 225 extends through the top seal 224. The position of the aperture 225 along the top seal 224 is off-center along the width (X direction) of the flexible pouch 20. The off-center position of the aperture 225 along the width of the top seal 224 is configured for the flexible pouch 20 to rotate from a stand-up position as depicted in FIG. 10 to a tilt position as depicted in FIG. 16 when the flexible pouch 20 is hung from an object 25 such as a rod, pin, nail, etc., extending through the aperture 225. That is, hanging the flexible pouch 20 with the object 25 extending through the aperture 225 results in the flexible pouch 20 rotating in a tilt position such that the opening 240 rotates in a downwardly direction (−Y direction). In embodiments, the opening 240 rotates in a downwardly direction between about 15 degrees to about 75 degrees. In other embodiments, the opening 240 rotates in a downwardly direction between about 30 degrees to about 60 degrees. Rotation of the flexible pouch 20 in a downwardly direction may prevent objects 19 from falling within the opening 240 as described in greater detail below.

In embodiments, the opening 240 includes the vertical passage top seal 266 and a tear-away notch 268 within the side seal 226b. The tear-away notch 268 affords for the vertical passage top seal 266 to be at least partially removed from the flexible pouch 20 such that a fluid passageway from the vertical passage 264 to an exterior of the flexible pouch 20 is provided. A reflective tape 270 may be attached to an inner surface of the vertical passage 264. In embodiments, the reflective tape 270 may attract insects to the opening 240. The vertical passage top seal 266 may be removed once the bottom frangible seal 209 has been ruptured and the first product has come into contact with the second product. The vertical passage top seal 266 allows for storage of the flexible pouch 20 and any products that may be contained within the upper compartment 250 and the lower compartment 260.

Referring now to FIG. 16, in use the flexible pouch 20 may include a first product contained within the upper compartment 250 and a second product contained in the lower compartment 260. The first product may include a solid such as, without limitation, yeast, and the second product may include a liquid such as, without limitation, water. The bottom frangible seal 209 is ruptured by applying a compressive force on the upper compartment 150. For example and without limitation, grasping and rolling the upper compartment 250 from the top seal 224 towards the bottom frangible seal 209 may create an internal pressure within the upper compartment 250 that exerts a force on the bottom frangible seal 209. Upon reaching a predefined force that is greater than a sealing force provided by the bottom frangible seal 209, the bottom frangible seal 209 ruptures a fluid passageway from the upper compartment 250 to the lower compartment 260 is created. Once the fluid passageway from the upper compartment 250 to the lower compartment 260 is created, the first product contained within the upper compartment 250 flows from the upper compartment 250 into the lower compartment 260 as depicted by arrow 16 and comes into contact and/or mixes with the second product and a third product is produced. A user may grasp the side seal 226b proximate the tear-away notch 268, grasp the upper seal proximate the tear-away notch 268 and upon pulling on the vertical passage top seal 266 in a direction away from the side seal 226b (−X direction) remove at least a portion of the vertical passage top seal 266 as depicted in FIG. 16. The third product, e.g., a gas such as without limitation carbon dioxide, exits the flexible pouch 20 by flowing up through the vertical passage 264 and out through the opening 240 after the vertical passage top seal 266 has been at least partially removed from the flexible pouch 20. The third product may attract insects such as, and without limitation, mosquitoes to the flexible pouch 20. The flexible pouch 20 can be hung (suspended) with the object 15 extending through the aperture 225 and the opening 240 rotates downwardly as described above. The reflective tape 270 may be visible from outside the flexible pouch 20 and may assist in attracting insects such as, and without limitation, mosquitoes to the flexible pouch 20. Upon rotating to a downward position, the opening 240 is at least partially protected from objects such as rain, leaves, etc. falling and entering the opening 240, thereby protecting the contents within the flexible pouch 20.

Based on the foregoing, it should now be understood that the flexible pouches and methods described herein can be used to for two-component products that may be brought into contact with each other to produce a third product. The use of the flexible pouches provides an upper compartment for containing a first product and a lower compartment for containing a second product. A frangible seal is positioned between the upper compartment and the lower compartment and when the frangible seal is broken, e.g., ruptured, a fluid passage way is formed between the upper compartment and the lower compartment. The fluid passageway allows the first product to flow from the upper compartment to the lower compartment and come into contact with the second product. Contact of the first product with the second product may generate or result in the creation of a desired third product. The third product may be allowed to escape of exit the flexible pouch through an opening by flowing from the lower compartment through a vertical passage extending from the lower compartment to the opening.

EXAMPLES

Example 1

|  | volume (ml) | density (g/ml) | weight (g) | weight percent |
|---|---|---|---|---|
| sucrose |  |  | 30 | 22.2926099 |
| water | 100 | 1.0028 | 100.28 | 74.51676402 |
| citronella oil | 0.15 | 0.897 | 0.13455 | 0.099982355 |
| licorice extract | 0.15 | 1.0613 | 0.159195 | 0.118295734 |
| yeast |  |  | 3 | 2.22926099 |
| thyme |  |  | 0.25 | 0.185771749 |
| rosemary |  |  | 0.25 | 0.185771749 |
| cinnamon |  |  | 0.25 | 0.185771749 |
| wheat flour |  |  | 0.125 | 0.092885875 |
| sodium bicarbonate |  |  | 0.125 | 0.092885875 |
|  |  | total weight | 134.573745 | 100 |

In the following examples the active ingredients including thyme, rosemary, cinnamon, and citronella oil may vary by +/−10% while the inert ingredients including water+/−10%, sugar+/−5%, yeast+/−5%, wheat flour+/−10%, sodium bicarbonate, +/−10% and licorice extract+/−10% may vary as indicated.

In a first example, the liquid ingredients of the mosquito control product may include 30 grams of sucrose, 100 milliliters of distilled water, 0.15 milliliters of citronella oil, and 0.15 milliliters of licorice extract. The dry ingredients may include 3 grams of yeast, 0.25 grams of thyme, 0.25 grams of rosemary, 0.25 grams of cinnamon, 0.125 grams of wheat flour, and 0.125 grams of sodium bicarbonate. The sucrose and yeast as described above are carriers to form carbon dioxide in a fermentation reaction. The licorice extract may act as a stabilizer and preservative. The wheat flour may be utilized as a supplemental food source for the yeast. Sodium bicarbonate may act as a buffer to a change in pH of the ingredients.

It should be realized that various types of yeast may be utilized. In one aspect the yeast may include both live and dead yeast. Additionally, the yeast may include specialized strains such as wine yeast or baker's yeast which may be more tolerant to higher levels of alcohol produced by the fermentation reaction.

Figure 17:
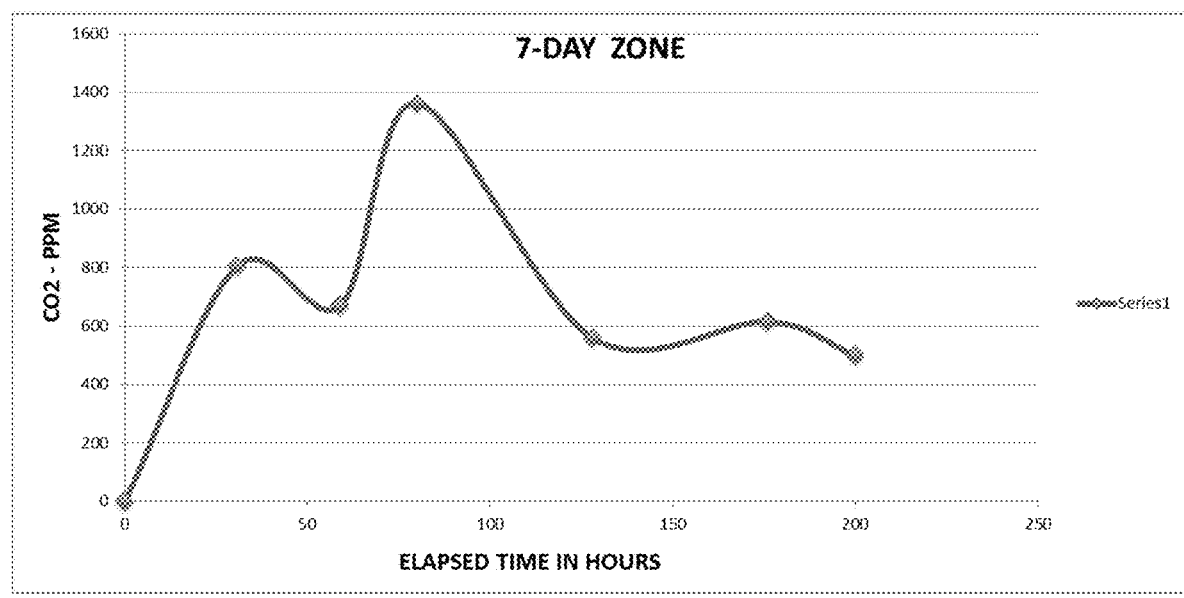
FIG. 17 is a plot of the $CO_2$ in parts per million as a function of time in hours for an embodiment of a mosquito control product.
Figure 18:
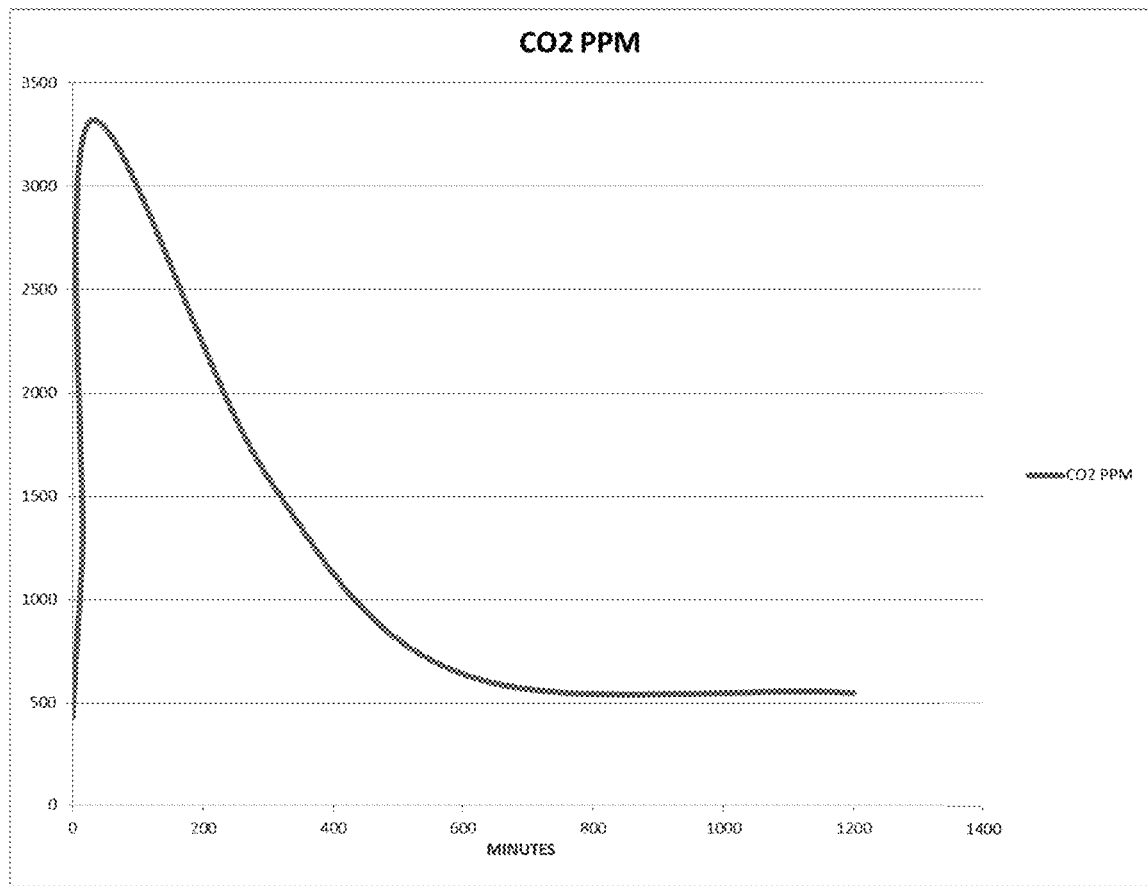
FIG. 18 is a plot of the $CO_2$ in parts per million as a function of time in minutes for an embodiment of a mosquito control product.

Referring to FIGS. 17 and 18, there are shown plots of the $CO_2$ production in parts per million as a function of time both for an observational period and as displayed in minutes for the formulation of Example 1. As can be seen in the plots, the $CO_2$ production ramps up quickly to reach a peak amount of 3,317 parts per million after half an hour of being activated by combining the liquid and dry ingredients. The formulation of Example 1 ramps up quickly and then begins to fall following 600 minutes of activation. The $CO_2$ may transport the active ingredients to contact or expose the mosquito and affect its desire for a blood meal.

Example 2

|  | volume (ml) | density (g/ml) | weight (g) | weight percent |
|---|---|---|---|---|
| sucrose |  |  | 35 | 0.18218176 |
| water | 150 | 1.0028 | 150.42 | 0.782965152 |
| citronella oil | 0.1 | 0.897 | 0.0897 | 0.000466906 |
| licorice extract | 0.1 | 1.0613 | 0.10613 | 0.000552427 |
| Yeast |  |  | 5 | 0.026025966 |
| thyme |  |  | 0.375 | 0.001951947 |
| rosemary |  |  | 0.375 | 0.001951947 |
| cinnamon |  |  | 0.375 | 0.001951947 |
| wheat flour |  |  | 0.1875 | 0.000975974 |
| sodium bicarbonate |  |  | 0.1875 | 0.000975974 |
|  |  | total weight | 192.11583 | 1 |

Figure 19:
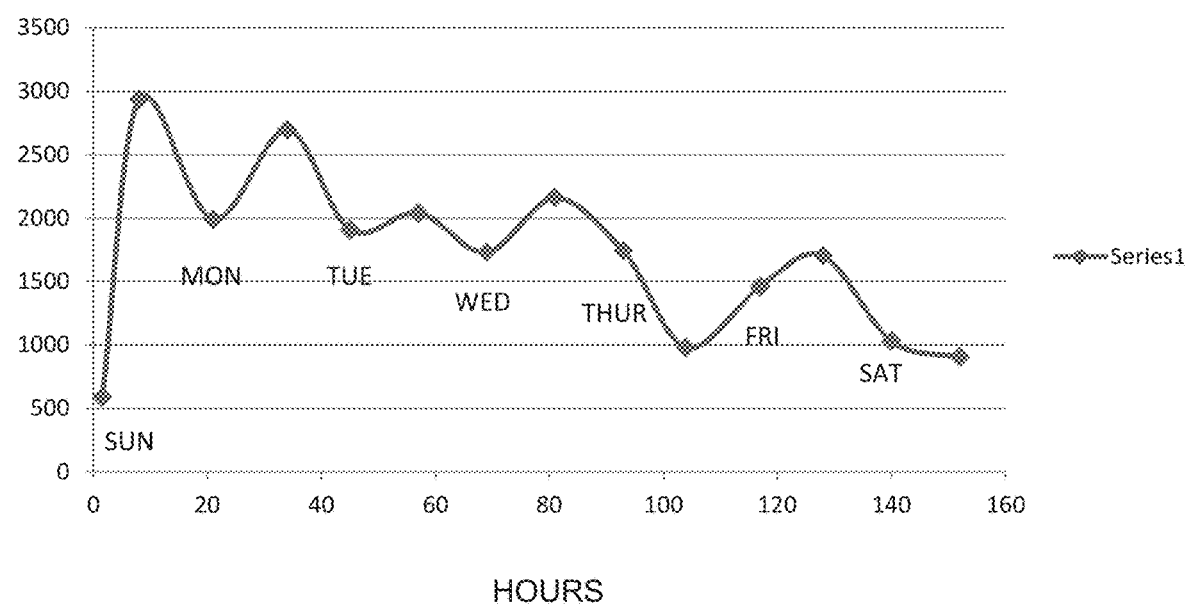
FIG. 19 is a plot of the $CO_2$ in parts per million and time in minutes for various time intervals.

The formulation may include inert ingredients including 150 milliliters of distilled water, 35 grams of sucrose, 5 grams of yeast, 0.1875 grams of wheat flour, 0.1875 grams of sodium bicarbonate, and 0.1 ml of licorice extract. The active ingredients may include 0.375 grams of thyme, 0.375 grams of rosemary, 0.375 grams of cinnamon, and 0.1 ml citronella oil. As described above, the liquid and dry ingredients may be combined to activate the mosquito control product such that a fermentation reaction between the yeast and sugar acts to produce carbon dioxide as a carrier for the active ingredients. Referring to FIG. 19, there is shown a plot of the $CO_2$ produced as a function of time in hours. As can be seen in the plot, the $CO_2$ production reaches a peak of around 10 hours with 3000 parts per million being produced. The $CO_2$ production begins to ramp down following the peak and levels out after approximately 160 hours following activation by combining the dry and liquid ingredients.

Example 3

|  | volume (ml) | density (g/ml) | weight (g) | weight percent |
|---|---|---|---|---|
| sucrose |  |  | 175 | 25.39422739 |
| water | 500 | 1.0028 | 501.4 | 72.75808921 |
| citronella oil | 0.12 | 0.897 | 0.10764 | 0.015619626 |
| licorice extract | 0.12 | 1.0613 | 0.127356 | 0.018480613 |
| yeast |  |  | 9 | 1.305988837 |
| thyme |  |  | 0.874 | 0.126826027 |
| rosemary |  |  | 0.874 | 0.126826027 |
| cinnamon |  |  | 0.874 | 0.126826027 |
| wheat flour |  |  | 0.438 | 0.063558123 |
| sodium bicarbonate |  |  | 0.438 | 0.063558123 |
|  |  | total weight | 689.132996 | 100 |

Figure 20:
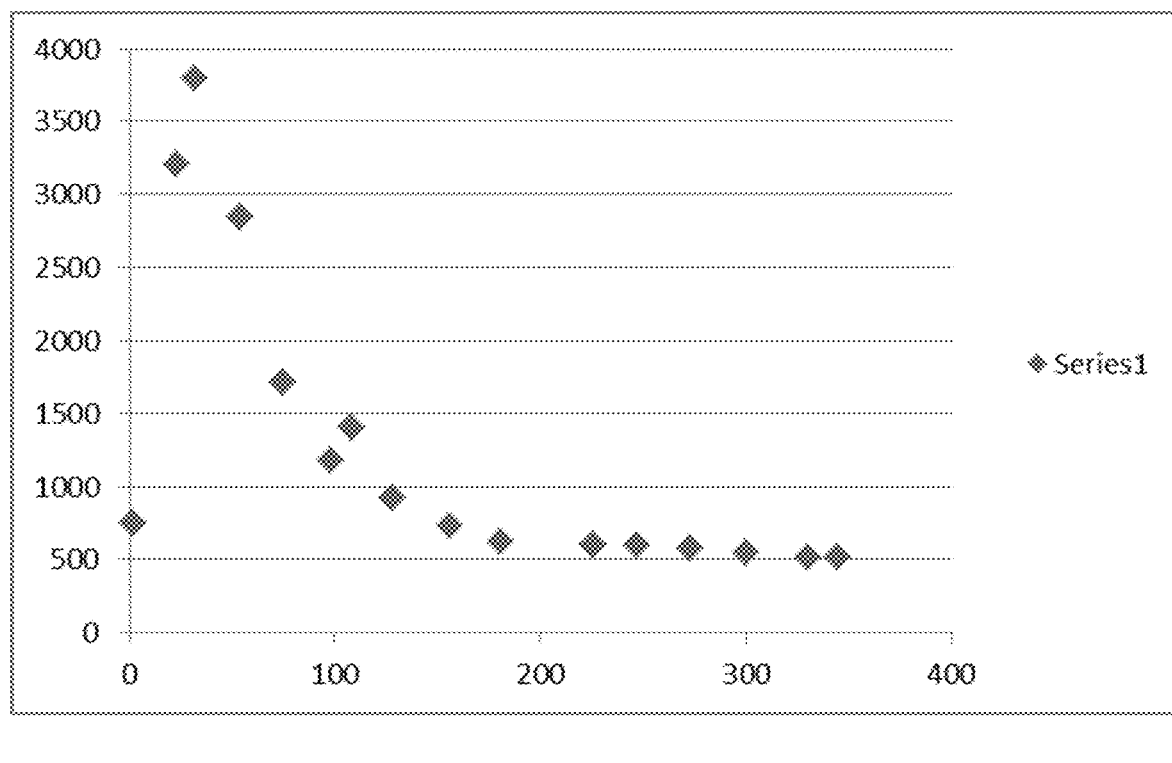
FIG. 20 is a plot of the $CO_2$ in parts per million as a function of time in hours for an embodiment of a mosquito control product.
Figure 21:
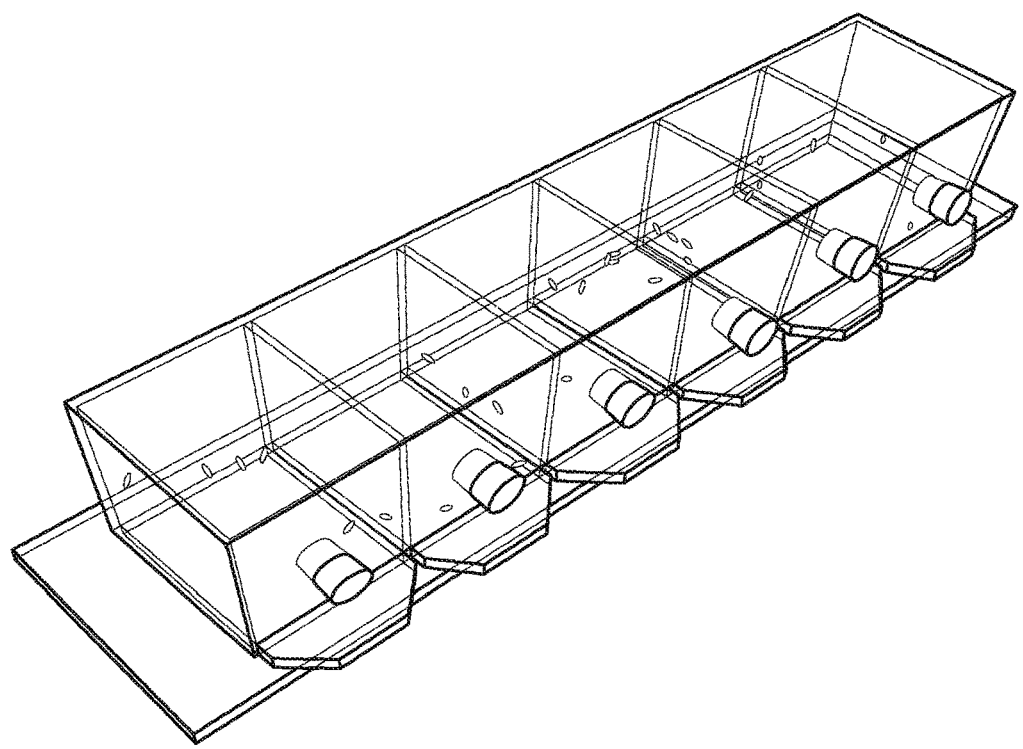
FIG. 21 is a graphical representation of an experimental apparatus used for testing.
Figure 22:
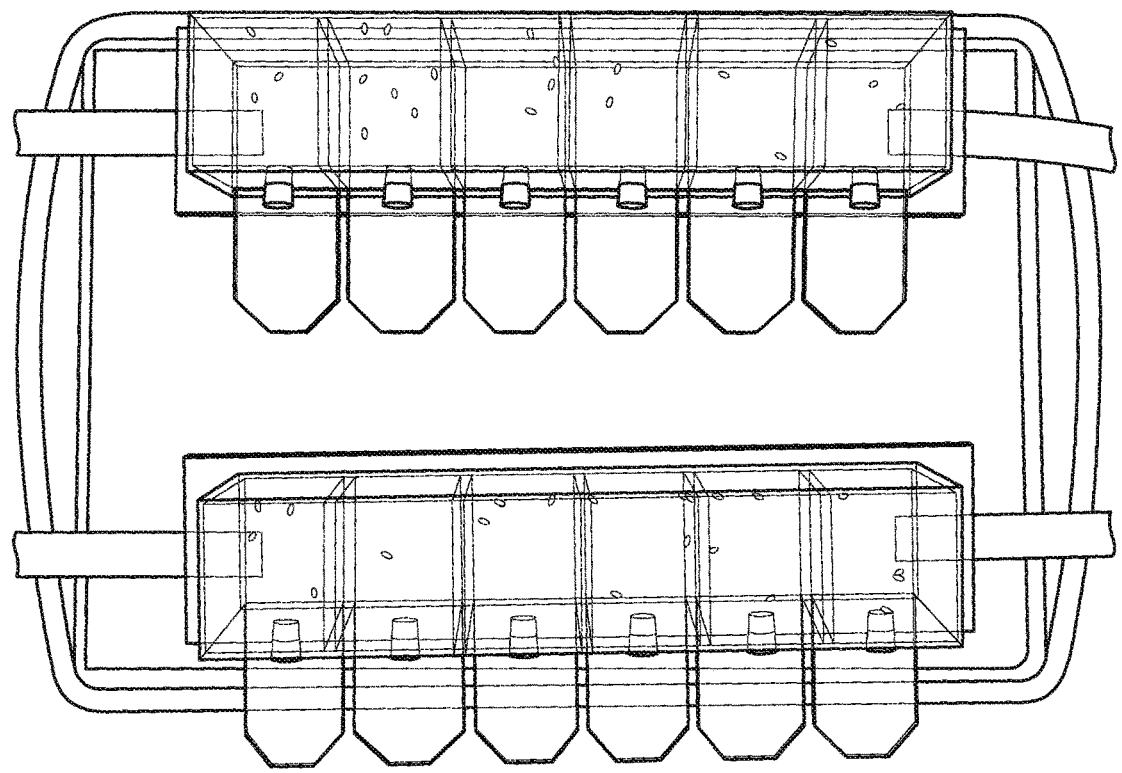
FIG. 22 is a graphical depiction of an experimental apparatus positioned over a blood source.
Figure 23:
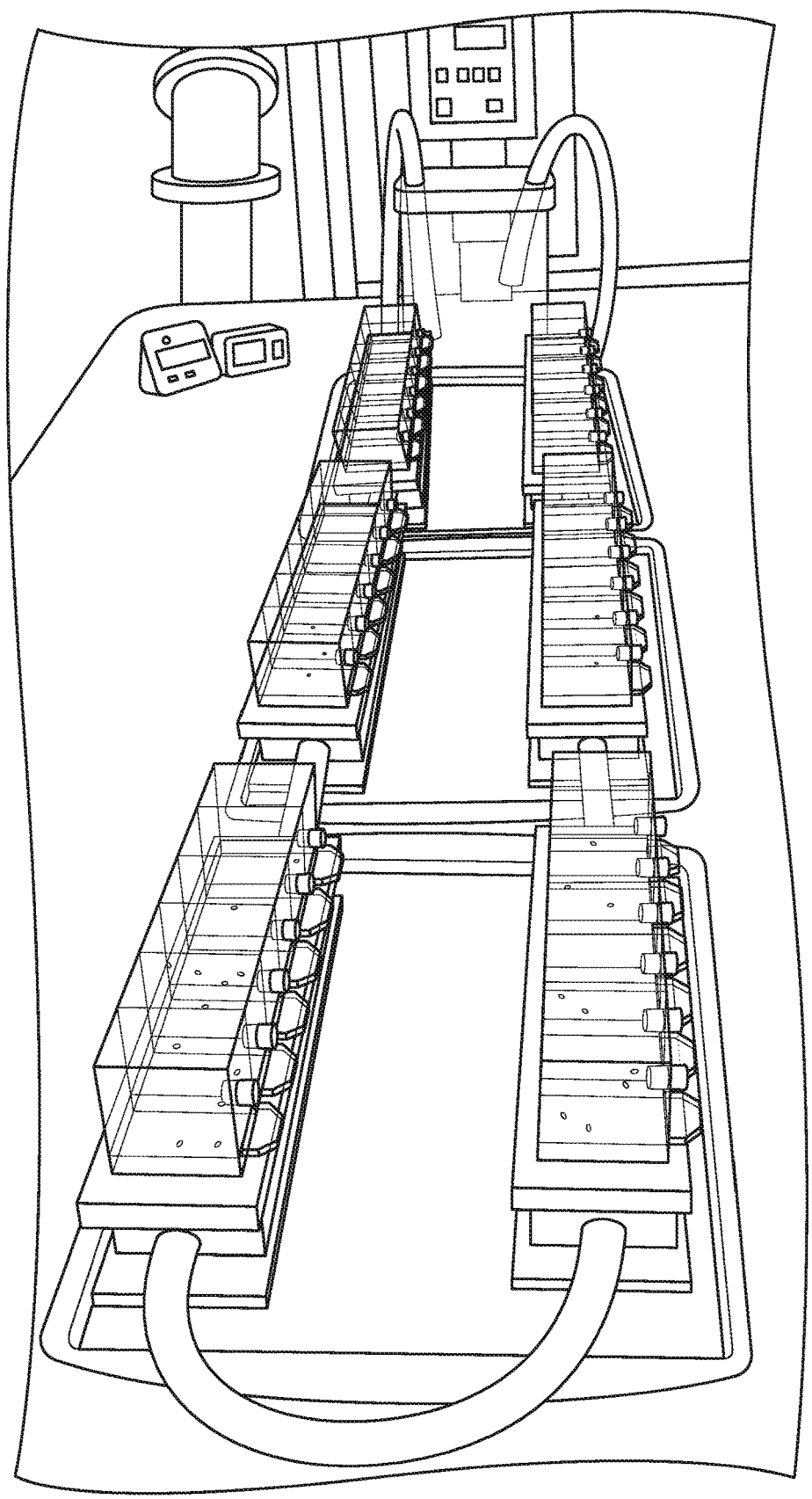
FIG. 23 is a graphical representation of an experimental apparatus including a circulating pump providing warm water to the testing apparatus.

The formulation may include inert ingredients including 500 milliliters of distilled water, 175 grams of sucrose, 9 grams of yeast including 4 grams of dead yeast and 5 grams of live yeast, 0.438 grams of wheat flour, 0.438 grams of sodium bicarbonate, and 0.12 ml of licorice extract. The active ingredients may include 0.874 grams of thyme, 0.874 grams of rosemary, 0.874 grams of cinnamon, and 0.12 ml citronella oil. As described above, the liquid and dry ingredients may be combined to activate the mosquito control product such that a fermentation reaction between the yeast and sugar acts to produce carbon dioxide as a carrier for the active ingredients. Referring to FIG. 20 there is shown a plot of the $CO_2$ produced as a function of time in hours. As can be seen in the plot, the $CO_2$ production reaches a peak of around 32 hours with 3798 parts per million being produced. The $CO_2$ production begins to ramp down following the peak and levels out after approximately 300 hours following activation by combining the dry and liquid ingredients.

Experiments were performed by exposing yellow fever mosquitos, Aedes aegypti, to formulations of the mosquito control product as described in Examples 1 and 2. The test organisms were 5 to 7 day old Aedes aegypti deprived of food (sugar water) for 24 hours to ensure biting activity. The testing included in vitro laboratory study of the mosquitos after exposure to the product for various time periods.

Bioassays were performed in a fluorescent lighted and air conditioned room using six chambered Plexiglas K & D modules stocked with five mosquitos per chamber. The modules were placed on top of a water reservoir containing surface wells filled with artificial blood and covered with collagen membranes, as depicted in FIGS. 4-7. The blood was heated to 38° C. using warm water pumped by a temperature controlled immersion circulator in a water bath. The six modules contained shallow blood wells etched into the surfaces.

Two trials were completed in which mosquitos were exposed to the activated product of Example 2 following activation of the dry and liquid ingredients for 6 hours. A second trial was completed by exposing mosquitos to 2 hours of the product of Example 2 after being activated for 48 hours. Nontreated mosquitos were used as a control in both trials. Eighteen replications of each of the two treatments were randomly assigned to three pairs of modules. Sliding doors located at the base of the modules were open to expose mosquitos to the membrane covered blood wells for 90-second bite counts.

The biting counts between control mosquitos and mosquitos that were exposed to the formulation of Example 2 were utilized to generate experimental data presented below in table 1.

TABLE 1

| Observation | (Example 2) | CONTROL |
|---|---|---|
| 1. | 2 | 4 |
| 2. | 2 | 2 |
| 3. | 1 | 1 |
| 4. | 2 | 1 |
| 5. | 1 | 4 |
| 6. | 1 | 1 |
| 7. | 2 | 3 |
| 8. | 2 | 4 |
| 9. | 4 | 3 |
| 10. | 1 | 4 |
| 11. | 3 | 3 |
| 12. | 2 | 3 |
| 13. | 1 | 3 |
| 14. | 3 | 2 |
| 15. | 0 | 4 |
| 16. | 1 | 1 |
| 17. | 0 | 2 |
| 18. | 1 | 5 |

A nonpaired t-test was performed on the data. The data was then analyzed using a pooled variance of the two data sets including the control and experimental pools. The pooled variance was calculated to be 1.335 and a corresponding standard error of 0.385. The separation in mean biting pressure between the two groups showing higher biting counts from the control mosquitos compared to those exposed to the product of Example 2 provides a t-statistic equal to 3.04 where p is equal to 0.0047. As can be seen, the reduction in biting pressure in the group exposed to the mosquito control product of Example 2 compared to the control group is highly significant at a 99.53 level. In other words, the risk of an error due to the sampling design is only p=0.0047.

The results of the mosquito control experiments indicate that exposure of the mosquitos to the product of Example 2 significantly reduced the biting pressure in comparison to the control mosquitos which were not exposed. The experimental results demonstrate that the product including the active ingredients affects the mosquitos exposed to the active ingredients such that they no longer seek a blood meal but would alternatively seek to find an alternative meal such as sugar or nectar. The controlled experiment utilized confined blood hungry female mosquitos which did not seek a blood meal and confirms the efficacy of reducing a mosquito's desire to seek a blood meal when exposed to the compositions as described in Examples 1 and 2. The formulations as described herein provide a safe, organic, and highly effective product to prevent biting mosquitos from seeking a blood meal.

Additional Testing Data

The formulas of examples 2 and 3 were packaged in the two component pouches as described above. The components were combined or activated as described above and positioned as described below.

Sarasota, Fla. Cricket Field

Prior to application of the formulas 2 and 3 the Cricket Field in Sarasota was difficult for spectators and players alike due to biting mosquitoes. Subsequent to placing pouches of the formulas of examples 2 and 3 every 30,000 square feet about the perimeter of the field the reported number of bites fell to zero. These tests began in October 2016 and continue with zero reported mosquito bites.

Tuguegaro City, Luzon, Philippines

A local school in the Philippines positioned the two component pouches including the formula of example 3 every 30,000 square feet around the periphery of a school yard utilized by students for recreation. Subsequent to placing pouches of the formulas of example 3 every 30,000 square feet about the perimeter of the yard the reported number of bites fell to zero. The example of formula 3 provides deterrence for 15 days and if not replaced the students experience biting in excess. Tuguegaro is in the Cagayan Valley region of northern Luzon and has been called the mosquito capitol of the World.

Company Field Documentation in Florida

A screened area of 300 square feet in central Sarasota, Fla. has been used to test the formulas of examples 1-3. Several species of mosquitoes including Aedes aegypti are allowed to enter the screened area. The formulas of examples 1-3 are packaged in the two component pouches and is activated and placed with mosquitoes for 2 hours. Personnel enter the screen area for 1 minute intervals after 2, 3, and 4 hours. Biting counts are tabulated as shown below. The process is repeated with new mosquitoes entering the screened area but with no treatment or exposure to the formulas of examples 1-3. The biting counts are tabulated as shown below. The Percent deterrence reached 83.6% when mosquitoes were exposed to the formulas of examples 1-3 for 2 hours prior to personnel entering the screened area at various time periods compared to the control where no exposure to formulas of examples 1-3 was present before personnel entered the screened area.

This type of experiment has limitations due to variation in species, ambient conditions, and ratios of male to female mosquitoes. However, rigor of the testing is enhanced by the fact that the mosquitoes cannot leave the screened area to find nectar food once their appetite for a blood meal is affected by exposure to the confounding agent. As described above, the formulas of examples 1-3 functions by confusing the female receptors after they are drawn to the product from distance then confounded by gases present in the immediate area of the product. In the natural environment the mosquito can fly away to feed on sugar, whereas in the screened area they cannot vacate to locate other food than blood necessary for good egg development. The 85% deterrence compared to 100% in a natural environment is likely explained by the inability of the female mosquito to exit the immediate location to find a sugar food source.

| Time (hr) | Bites Control | Bites Treated with Formula |
|---|---|---|
| 2 | 12 | 2 |
| 3 | 9 | 1 |
| 4 | 18 | 3 |
| 5 | 22 | 4 |

P value and statistical significance: The two-tailed P value equals 0.0054 By conventional criteria, this difference is considered to be very statistically significant. Confidence interval: The mean of Group One minus Group Two equals 12.75 95% confidence interval of this difference: From 5.42 to 20.08 Intermediate values used in calculations: t=4.2549, df=6, standard error of difference=2.997. In other words, the significance level is 99.9946.

We claim:

1. A mosquito control product comprising:
a two part composition including separated wet and dry ingredients, the wet and dry ingredients including active and inert ingredients, wherein when the wet and dry ingredients are combined they form a carrier agent which contacts a mosquito with the active ingredients to discourage the mosquito from seeking a blood meal;
the dry ingredients comprise sugar, yeast, thyme, rosemary, and cinnamon; and
the wet ingredients comprise water.

2. The mosquito control product of claim 1 wherein the dry ingredients further include components that are selected from the group consisting of: wheat flour and sodium bicarbonate.

3. The mosquito control product of claim 1 wherein the wet ingredients further include a component selected from the group consisting of citronella oil, licorice extract, and a mixture of thereof.

4. The mosquito control product of claim 1 wherein the inert ingredients include water, sugar, yeast, and further include a component selected from the group consisting of wheat flour, sodium bicarbonate, licorice extract, and a mixture thereof.

5. The mosquito control product of claim 1 wherein the active ingredients include thyme, rosemary, cinnamon, and further include citronella oil.

6. The mosquito control product of claim 1 wherein the carrier agent is carbon dioxide which acts as a mosquito attractant.

7. The mosquito control product of claim 4 wherein sugar is present in an amount of from 15 to 30% by weight, water is present in an amount of from 68 to 80% by weight, yeast is present in an amount of from 1 to 3% by weight, wheat flour is present in an amount of from 0.05 to 0.1% by weight, sodium bicarbonate is present in an amount of from 0.05 to 0.1% by weight, and licorice extract is present in an amount of from 0.05 to 0.15% by weight.

8. The mosquito control product of claim 5 wherein thyme is present in an amount of from 0.1 to 0.2% by weight, rosemary is present in an amount of from 0.1 to 0.2% by weight, cinnamon is present in an amount of from 0.1 to 0.2% by weight, and citronella oil is present in an amount of from 0.01 to 0.1% by weight.

9. The mosquito control product of claim 1 further including lactic acid acting as a mosquito attractant.

10. A mosquito control product comprising:
a two part composition including separated wet and dry ingredients including active and inert ingredients, wherein
the dry ingredients are positioned in an upper compartment of a pouch, and the wet ingredients are positioned in a lower compartment of the pouch, the upper and lower compartments separated by a frangible seal, wherein when the frangible seal is ruptured the wet and dry ingredients combine to form a carrier agent exiting the pouch and contacting a mosquito with the active ingredients to discourage the mosquito from seeking a blood meal;
the dry ingredients comprise sugar, yeast, thyme, rosemary, and cinnamon; and
the wet ingredients comprise water.

11. The mosquito control product of claim 10 wherein the dry ingredients further include components that are selected from the group consisting of: wheat flour and sodium bicarbonate and wherein the wet ingredients further include components that are selected from the group consisting of: citronella oil, and licorice extract.

12. The mosquito control product of claim 10 wherein the inert ingredients include water, sugar, yeast, and further include a component selected from the group consisting of wheat flour, sodium bicarbonate, licorice extract, and a mixture thereof.

13. The mosquito control product of claim 10 wherein the active ingredients include thyme, rosemary, cinnamon, and further include citronella oil.

14. The mosquito control product of claim 10 wherein the carrier agent is carbon dioxide which acts as a mosquito attractant.

15. The mosquito control product of claim 12 wherein sugar is present in an amount of from 15 to 30% by weight, water is present in an amount of from 68 to 80% by weight, yeast is present in an amount of from 1 to 3% by weight, wheat flour is present in an amount of from 0.05 to 0.1% by weight, sodium bicarbonate is present in an amount of from 0.05 to 0.1% by weight, and licorice extract is present in an amount of from 0.05 to 0.15% by weight.

16. The mosquito control product of claim 13 wherein thyme is present in an amount of from 0.1 to 0.2% by weight, rosemary is present in an amount of from 0.1 to 0.2% by weight, cinnamon is present in an amount of from 0.1 to 0.2% by weight, and citronella oil is present in an amount of from 0.01 to 0.1% by weight.

17. The mosquito control product of claim 10 further including lactic acid acting as a mosquito attractant.

* * * * *